US012794295B2

(12) United States Patent
Garrard et al.

(10) Patent No.: US 12,794,295 B2
(45) Date of Patent: Nov. 10, 2026

(54) ROTOR HAVING A PLURALITY OF COOLING JETS AND ELECTRIC MOTOR INCLUDING THE SAME

(71) Applicant: BorgWarner Inc., Auburn Hills, MI (US)

(72) Inventors: Tyler Ransom Garrard, Arden, NC (US); Aliihsan Karamavruc, Fletcher, NC (US); Christopher Joel Maurus, Hendersonville, NC (US)

(73) Assignee: BORGWARNER INC., Auburn Hills, MI (US)

( * ) Notice: Subject to any disclaimer, the term of this patent is extended or adjusted under 35 U.S.C. 154(b) by 362 days.

(21) Appl. No.: 18/241,424

(22) Filed: Sep. 1, 2023

(65) Prior Publication Data

US 2025/0079917 A1 Mar. 6, 2025

(51) Int. Cl.
*H02K 1/32* (2006.01)
*H02K 7/08* (2006.01)
*H02K 9/19* (2006.01)

(52) U.S. Cl.
CPC ............... *H02K 1/32* (2013.01); *H02K 7/083* (2013.01); *H02K 9/19* (2013.01)

(58) Field of Classification Search
CPC .......... H02K 1/32; H02K 5/203; H02K 7/083; H02K 9/19
USPC .......................................................... 310/54
See application file for complete search history.

(56) References Cited

U.S. PATENT DOCUMENTS 4,600,848 A * 7/1986 Sutrina .................... H02K 9/19 310/211
4,786,111 A * 11/1988 Yargici ................... E21C 35/23 404/90
6,087,744 A * 7/2000 Glauning ............... H02K 5/203 310/58
(Continued)

FOREIGN PATENT DOCUMENTS

CN 106787452 A 5/2017
CN 108127547 A * 6/2018 ........... B24B 31/116
(Continued)

OTHER PUBLICATIONS

Translation of foreign document CN 108127547 A (Year: 2018).*
(Continued)

*Primary Examiner* — Alex W Mok
(74) *Attorney, Agent, or Firm* — Howard & Howard Attorneys PLLC

(57) ABSTRACT

An electric motor includes a stator and rotor. The stator includes a stator core defining a stator bore, and a plurality of windings having end turns extending from the stator core. This includes a central region configured to be disposed in the stator bore, and first and second end regions extending from the central region and aligned with the end turns of the plurality of windings. The rotor defines a cooling bore in fluid communication with a low-pressure cooling fluid source and includes a plurality of cooling jets in fluid communication with the cooling bore and disposed in the first and second end regions. The plurality of cooling jets extends radially outward such that each cooling jet is configured to pull cooling fluid through the cooling bore and eject cooling fluid toward the end turns in response to centrifugal force caused by rotation of the rotor within the stator bore.

19 Claims, 9 Drawing Sheets

(56) References Cited

U.S. PATENT DOCUMENTS

| | | | | |
|---|---|---|---|---|
| 6,326,706 | B1 * | 12/2001 | Zhang | F04B 35/045 310/12.32 |
| 6,727,609 | B2 * | 4/2004 | Johnsen | H02K 1/32 310/58 |
| 8,916,997 | B2 * | 12/2014 | Kirkley, Jr. | H02K 5/203 310/90 |
| 9,154,006 | B2 * | 10/2015 | Yamamoto | H02K 1/2766 |
| 9,306,433 | B2 * | 4/2016 | Sten | H02K 9/193 |
| 9,567,991 | B2 * | 2/2017 | Mohamed | F04B 53/1022 |
| 9,660,505 | B2 * | 5/2017 | Pal | H02K 9/19 |
| 9,762,106 | B2 * | 9/2017 | Gauthier | H02K 1/32 |
| 11,108,302 | B2 * | 8/2021 | Tomescu | H02K 1/32 |
| 11,621,597 | B2 * | 4/2023 | Yagyu | H02K 1/278 310/54 |
| 12,027,922 | B2 * | 7/2024 | Dang | H02K 21/14 |
| 12,160,159 | B2 * | 12/2024 | Barden | H02K 9/19 |
| 2003/0030333 | A1 * | 2/2003 | Johnsen | H02K 1/32 310/54 |
| 2008/0197725 | A1 * | 8/2008 | Husband | H02K 9/04 310/59 |
| 2012/0104884 | A1 * | 5/2012 | Wagner | H02K 1/32 310/54 |
| 2012/0275733 | A1 * | 11/2012 | Kastinger | H02K 7/081 384/296 |
| 2013/0313928 | A1 * | 11/2013 | McKinzie | H02K 1/32 310/54 |
| 2014/0117795 | A1 * | 5/2014 | Dedrich | H02K 9/19 310/54 |
| 2015/0180313 | A1 * | 6/2015 | Hayashi | H02K 16/02 310/54 |
| 2015/0288255 | A1 * | 10/2015 | Barker | H02K 1/2781 310/43 |
| 2016/0013704 | A1 * | 1/2016 | Wagner | H02K 9/19 310/54 |
| 2016/0164378 | A1 * | 6/2016 | Gauthier | H02K 9/19 310/54 |
| 2016/0241113 | A1 * | 8/2016 | Suzuki | H02K 1/32 |
| 2016/0352181 | A1 * | 12/2016 | Randria | H02K 9/16 |
| 2018/0205294 | A1 * | 7/2018 | Manabe | H02K 5/1732 |
| 2019/0312475 | A1 * | 10/2019 | Seidl | H02K 17/16 |
| 2020/0227964 | A1 * | 7/2020 | Ronning | H02K 1/32 |
| 2021/0203202 | A1 * | 7/2021 | Yagyu | H02K 1/278 |
| 2021/0408854 | A1 | 12/2021 | Wang et al. | |

FOREIGN PATENT DOCUMENTS

| | | | | | |
|---|---|---|---|---|---|
| CN | 109038951 | A | | 12/2018 | |
| CN | 111969791 | A | | 11/2020 | |
| CN | 215772839 | U | | 2/2022 | |
| CN | 114665638 | A | | 6/2022 | |
| CN | 218829311 | U | | 4/2023 | |
| IN | 217508397 | U | | 9/2022 | |
| JP | 2019068622 | A | | 4/2019 | |
| JP | 2021151126 | A | * | 9/2021 | H02K 9/19 |
| WO | 2016189229 | A1 | | 12/2016 | |

OTHER PUBLICATIONS

English language abstract and machine-assisted English translation for CN 106787451 A extracted from espacenet.com database on Sep. 2, 2023, 9 pages.
English language abstract and machine-assisted English translation for CN 109038951 A extracted from espacenet.com database on Sep. 2, 2023, 10 pages.
English language abstract and machine-assisted English translation for CN 111969791 A extracted from espacenet.com database on Sep. 2, 2023, 19 pages.
English language abstract and machine-assisted English translation for CN 215772839 U extracted from espacenet.com database on Sep. 2, 2023, 9 pages.
English language abstract and machine-assisted English translation for CN 114665638 A extracted from espacenet.com database on Sep. 2, 2023, 9 pages.
English language abstract and machine-assisted English translation for CN 217508397 U extracted from espacenet.com database on Sep. 2, 2023, 11 pages.
Machine-assisted English language abstract and machine-assisted English translation for CN 218829311 U extracted from espacenet.com database on Sep. 2, 2023, 20 pages.
English language abstract and machine-assisted English translation for JP 2019-068622 A extracted from espacenet.com database on Sep. 2, 2023, 10 pages.
English language abstract and machine-assisted English translation for WO 2016/189229 A1 extracted from espacenet.com database on Sep. 2, 2023, 9 pages.

* cited by examiner

ROTOR HAVING A PLURALITY OF COOLING JETS AND ELECTRIC MOTOR INCLUDING THE SAME

TECHNICAL FIELD

The present disclosure relates generally to electric motors and, more specifically, to rotors for electric motors and cooling of such rotors by surrounding components of the rotor with cooling jets.

BACKGROUND

High-speed electric motors are widely used in various applications including automotive applications. These motors are designed to operate at rotational speeds exceeding 50,000 revolutions per minute (RPM). Accordingly, high-speed electric motors are known to generate a substantial amount of heat during operation, which may degrade performance and reliability.

Traditional cooling arrangements for cooling the components of an electric motor are not suitable for high-speed electric motors due to geometric design limitations, the risk of introducing rotational imbalances, and the risk of causing cavitation of the cooling fluid as the cooling fluid flows through the electric motor. Therefore, there is a need for an improved arrangement for cooling the rotor and surrounding components in a high-speed electric motor.

SUMMARY AND ADVANTAGES

One general aspect of the present disclosure is directed to an electric motor. The electric motor includes a stator and a rotor. The stator includes a stator core having a first end and a second end opposite the first end. The stator core defines a stator bore extending between the first end and the second end and a rotational axis concentric with the stator bore. The stator also includes a plurality of windings operatively attached to the stator core and having end turns extending beyond the first end and the second end of the stator core. The rotor is configured for rotation about the rotational axis in response to the plurality of windings being energized. The rotor includes a central region disposed in the stator bore. The rotor also includes a first end region extending from the central region and beyond the stator bore such that the first end region is aligned with the end turns extending beyond the first end of the stator core. The rotor further includes a second end region extending from the central region and beyond the stator bore such that the second end region is aligned with the end turns extending beyond the second end of the stator core. The first end region, the central region, and the second end region cumulatively define a cooling bore extending along the rotational axis between a fluid inlet defined by the first end region and a terminal end defined by the second end region. The fluid inlet of the cooling bore is in fluid communication with a low-pressure cooling fluid source and configured to receive cooling fluid from the low-pressure cooling fluid source. The rotor also further includes a plurality of first cooling jets disposed in the first end region of the rotor and in fluid communication with the cooling bore and extending radially outward. Each first cooling jet is configured to pull cooling fluid through the cooling bore and eject cooling fluid toward the end turns extending beyond the first end of the stator core in response to centrifugal force caused by rotation of the rotor about the rotational axis. The rotor additionally includes a plurality of second cooling jets disposed in the second end region of the rotor and in fluid communication with the cooling bore and extending radially outward. Each second cooling jet is configured to pull cooling fluid through the cooling bore and eject cooling fluid toward the end turns extending beyond the second end of the stator core in response to centrifugal force caused by rotation of the rotor about the rotational axis.

Another general aspect of the present disclosure includes a rotor for an electric motor, with the rotor configured for rotation about a rotational axis. The rotor includes a central region extending between a first end and a second end, a first end region extending from the first end of the central region, and a second end region extending from second end of the central region. The first end region, the central region, and the second end region cumulatively define a cooling bore extending along the rotational axis between a fluid inlet defined by the first end region and a terminal end defined by the second end region. The fluid inlet of the cooling bore is configured to be arranged in fluid communication with a low-pressure cooling fluid source to receive cooling fluid from the low-pressure cooling fluid source. The rotor also includes a plurality of first cooling jets disposed in the first end region and in fluid communication with the cooling bore and extending radially outward. Each first cooling jet has a first diameter ($D_1$) and is configured to pull cooling fluid through the cooling bore and eject cooling fluid radially at a first flowrate in response to centrifugal force caused by rotation of the rotor about the rotational axis. The rotor further includes a plurality of second cooling jets disposed in the second end region and in fluid communication with the cooling bore and extending radially outward. Each second cooling jet has a second diameter ($D_2$), greater than $D_1$, and is configured to pull cooling fluid through the cooling bore and eject cooling fluid radially at a second flowrate, equal to the first flowrate, in response to centrifugal force caused by rotation of the rotor about the rotational axis.

The present disclosure provides improved arrangements for effectively cooling the rotor and surrounding components of an electric motor (such as the end turns of the plurality of windings). Furthermore, the plurality of first cooling jets and the plurality of second cooling jets of the rotor provide the advantages of eliminating the need for high-pressure cooling fluid source to push cooling fluid through the cooling bore, reducing the likelihood of cavitation of the cooling fluid during operation of the electric motor at high speeds, and reducing the likelihood of causing rotational imbalances in the rotor.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
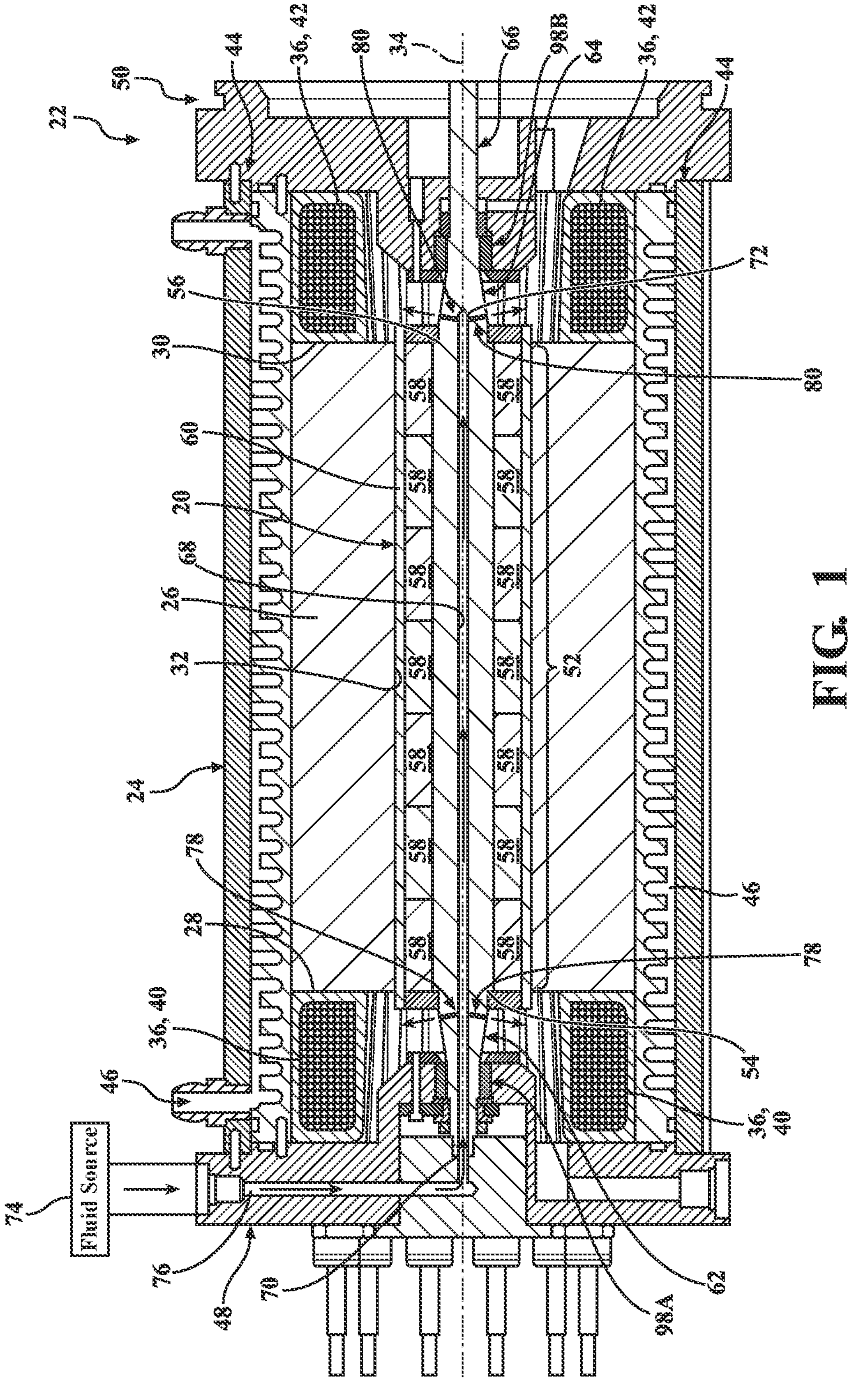
FIG. 1 is a cross-sectional representation of an electric motor including a stator and a rotor including a plurality of first cooling jets and a plurality of second cooling jets.

Referring to the drawings, wherein like reference numerals are used to identify like or identical components in the various views, FIG. 1 illustrates a rotor 20 according to the present disclosure and an electric motor 22 including the same. The electric motor is typically high-speed (e.g. in excess of 50,000 RPM) and may be one of a variety of electric motor types, such as an AC induction motor or a DC brushless motor. It should also be appreciated that the electric motor 22 may be configured to operate as a generator. Of course, it should be further appreciated that in some applications, such as electric vehicles, the electric motor 22 may be configured to operate both as a motor (to propel the vehicle) and as a generator (to regeneratively brake the vehicle).

The electric motor 22 includes a stator 24. The stator 24 includes a stator core 26 having a first end 28 and a second end 30 opposite the first end 28. The stator core 26 may comprise a lamination of a plurality of metallic sheets; however, other configurations are contemplated. The stator core 26 defines a stator bore 32 extending between the first end 28 and the second end 30 and a rotational axis 34 concentric with the stator bore 32. The stator 24 also includes a plurality of windings 36 operatively attached to the stator core 26 and having end turns 40, 42 extending beyond the first end 28 and the second end 30 of the stator core 26. The configuration of the plurality of windings 36 (e.g. the material, the cross-sectional shape of each winding, and the manner and pattern in which the plurality of windings 36 are operatively attached to the stator core 26) is not particularly limited. For example, the plurality of windings 36 may be configured as concentrated windings, distributed windings, lap windings, wave windings, etc. Broadly, the plurality of windings 36 are configured to be energized to cause the rotor 20 to rotate about the rotational axis 34. The stator 24 may also include an outer casing 44 surrounding the stator core 26. The outer casing 44 may define a cooling loop 46 configured to receive and circulate a cooling fluid to cool the outer periphery of the stator core 26. The stator 24 may further include end caps 48, 50 disposed at each end of the stator 24 to enclose the stator 24.

Figure 2:
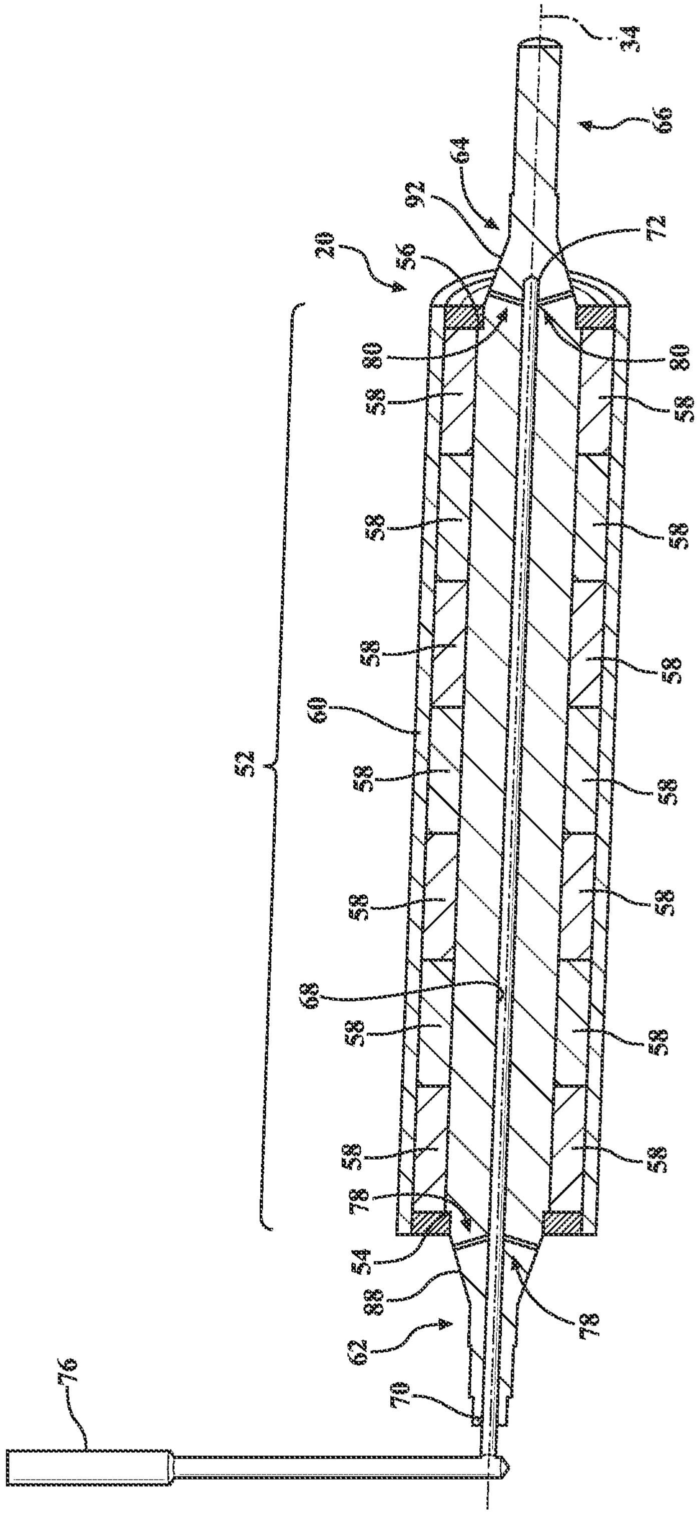
FIG. 2 is a perspective cross-sectional representation of the rotor including the plurality of first cooling jets and the plurality of second cooling jets.

Referring to FIG. 1 and FIG. 2, the rotor 20 includes a central region 52 extending between a first end 54 and a second end 56. As shown in FIG. 1, the central region 52 of the rotor 20 is disposed in the stator bore 32 such that the rotor 20 is configured for rotation about the rotational axis 34 in response to the plurality of windings 36 being energized. The central region 52 of the rotor 20 may include a plurality of magnets 58. The plurality of magnets 58 may be configured to electromagnetically interact with the plurality of windings 36 to cause the rotor 20 to rotate about the rotational axis 34 in response to the plurality of windings 36 being energized. The central region 52 of the rotor 20 may also include a compression sleeve 60 that surrounds the plurality of magnets 58. In one example, the compression sleeve 60 is comprised of a metallic construction or a composite composition; however, other configurations are contemplated.

The rotor 20 also includes a first end region 62 extending from the first end 54 of the central region 52. As shown in FIG. 1, the first end region 62 extends beyond the stator bore 32 such that the first end region 62 is aligned with the end turns 40 that extend beyond the first end 28 of the stator core 26. The rotor 20 further includes a second end region 64 extending from the second end 56 of the central region 52. As shown in FIG. 1, the second end region 64 extends beyond the stator bore 32 such that the second end region 64 is aligned with the end turns 42 that extend beyond the second end 30 of the stator core 26. The first end region 62 and the second end region 64 may have a tapered profile (i.e., the diameter of the first end region 62 and the second end region 64 may decrease as the first end region 62 and the second end region 64 extend away from the central region 52). The second end region 64 may further include a coupling region 66 extending through the end cap 50 and configured to be coupled with an external component (such as the drivetrain of a vehicle) to transmit the torque generated by the electric motor 22 to the external component. Likewise, where the electric motor 22 is configured to be operated as a generator, the coupling region 66 may be configured to receive torque and transmit the torque from the external component to the rotor 20.

As shown in FIG. 1 and FIG. 2, the first end region 62, the central region 52, and the second end region 64 cumulatively define a cooling bore 68. The cooling bore 68 extends along the rotational axis 34 between a fluid inlet 70 defined by the first end region 62 and a terminal end 72 defined by the second end region 64. The cooling bore 68 may be defined by a cooling bore diameter ($D_{CB}$). As shown in FIG. 1, the fluid inlet 70 is in fluid communication with a low-pressure cooling fluid source 74 and configured to receive cooling fluid from the low-pressure cooling fluid source 74. The cooling fluid may be any fluid suitable for effectuating heat transfer from the componentry of the electric motor 22. For example, the cooling fluid may comprise a liquid-based coolant such as oil, water ethylene glycol, water propylene glycol, a refrigerant, or the like. The electric motor 22 may include a cooling fluid passage 76 defined by the end cap 48. The cooling fluid passage 76 may be disposed in fluid communication with the low-pressure cooling fluid source 74 and the fluid inlet 70 of the cooling bore 68 to direct cooling fluid from the low-pressure cooling fluid source 74 into the cooling bore 68.

With continued reference to FIG. 1 and FIG. 2, the rotor 20 also includes a plurality of first cooling jets 78 disposed in the first end region 62 of the rotor 20. Each first cooling jet 78 is in fluid communication with the cooling bore 68 and extend radially outward. Accordingly, each first cooling jet 78 is configured to pull cooling fluid through the cooling bore 68 and eject cooling fluid radially outward (i.e., toward the end turns 40 that extend beyond first end 28 of the stator core 26) in response to centrifugal force caused by rotation of the rotor 20 about the rotational axis 34. Additionally, the rotor 20 further includes a plurality of second cooling jets 80 disposed in the second end region 64 of the rotor 20. Each second cooling jet 80 is in fluid communication with the cooling bore 68 and extend radially outward. Accordingly, each second cooling jet 80 is configured to pull cooling fluid through the cooling bore 68 and eject cooling fluid radially outward (i.e., toward the end turns 42 that extend beyond second end 30 of the stator core 26) in response to centrifugal force caused by rotation of the rotor 20 about the rotational axis 34. The flow of cooling fluid from the low-pressure cooling fluid source 74 and through the cooling bore 68 and out of the plurality of first cooling jets 78 and plurality of second cooling jets 80 is generally indicated with arrows in FIG. 1.

Stated differently, when the electric motor 22 is operating at high speeds, each first cooling jet 78 is configured to pull cooling fluid through the cooling bore 68 and eject cooling fluid radially outward toward the end turns 40 and into a first cooling fluid gallery 82 defined by the space between the first end region 62 and the end turns 40 in response to centrifugal force caused by rotation of the rotor 20 about the rotational axis 34, thereby cooling the end turns 40. Similarly, when the electric motor 22 is operating at high speeds, each second cooling jet 80 is configured to pull cooling fluid through the cooling bore 68 and eject cooling fluid radially outward toward the end turns 42 and into a second cooling fluid gallery 84 defined by the space between the second end region 64 and the end turns 42 in response to centrifugal force caused by rotation of the rotor 20 about the rotational axis 34, thereby cooling the end turns 42. Advantageously, the plurality of first cooling jets 78 and the plurality of second cooling jets 80 described herein eliminate the need for a high-pressure cooling fluid source for pushing the cooling fluid through the cooling bore 68 when the electric motor 22 is operating at high speeds. Instead, the plurality of first cooling jets 78 and the plurality of second cooling jets 80 pull cooling fluid through the cooling bore 68 by virtue of being in fluid communication with the cooling bore 68 and extending radially away from the cooling bore 68, thereby ejecting (i.e., flinging) cooling fluid toward the end turns 40, 42 in response to centrifugal force caused by rotation of the rotor 20 about the rotational axis 34.

It also should be appreciated that when the electric motor 22 is operating at lower speeds, the centrifugal force caused by rotation of the rotor 20 about the rotational axis 34 may not be sufficient for the plurality of first cooling jets 78 and the plurality of second cooling jets 80 to pull cooling fluid through the cooling bore 68 and eject cooling fluid radially outward. Accordingly, the low-pressure cooling fluid source 74 may be configured to provide cooling fluid to the fluid inlet 70 of the cooling bore 68 at a moderate pressure (e.g. from about 2 to about 5 bar) to push the cooling fluid through the plurality of first cooling jets 78 and the plurality of second cooling jets 80 to cool the end turns 40, 42 where the electric motor 22 is operating at lower speeds.

To reduce the likelihood of cavitation of the cooling fluid during operation of the electric motor 22 at high speeds, the plurality of first cooling jets 78 and the plurality of second cooling jets 80 are configured to eject cooling fluid at equal flowrates. In other words, the plurality of first cooling jets 78 are configured to eject cooling fluid at a first flowrate in response to centrifugal force caused by rotation of the rotor 20 about the rotational axis 34, and the plurality of second cooling jets 80 are configured to eject cooling fluid at a second flowrate, equal to the first flowrate, in response to centrifugal force caused by rotation of the rotor about the rotational axis.

To effectuate such equal flowrates, the geometric parameters (particularly, the ratio of length (L) to diameter (D)) of each of the first cooling jets 78 and the second cooling jets 80 are defined to produce a desired amount of suction force (i.e., the force which pulls cooling fluid through the cooling bore 68) in response to centrifugal force caused by rotation of the rotor 20 about the rotational axis 34. In other words, the geometric parameters of each of the first cooling jets 78 and the second cooling jets 80 must be defined such that the suction forces generated by each of the first cooling jets 78 and the second cooling jets 80 in response to centrifugal force caused by rotation of the rotor 20 about the rotational axis 34 are balanced such that the plurality of first cooling jets 78 and the plurality of second cooling jets 80 do not starve each other of cooling fluid flow from the cooling bore 68. Accordingly, in some configurations, plurality of first cooling jets 78 is configured to reach a choke flow condition (i.e., a maximum flowrate) before the plurality of second cooling jets 80 in response to centrifugal force caused by rotation of the rotor 20 about the rotational axis 34.

Figure 3B:
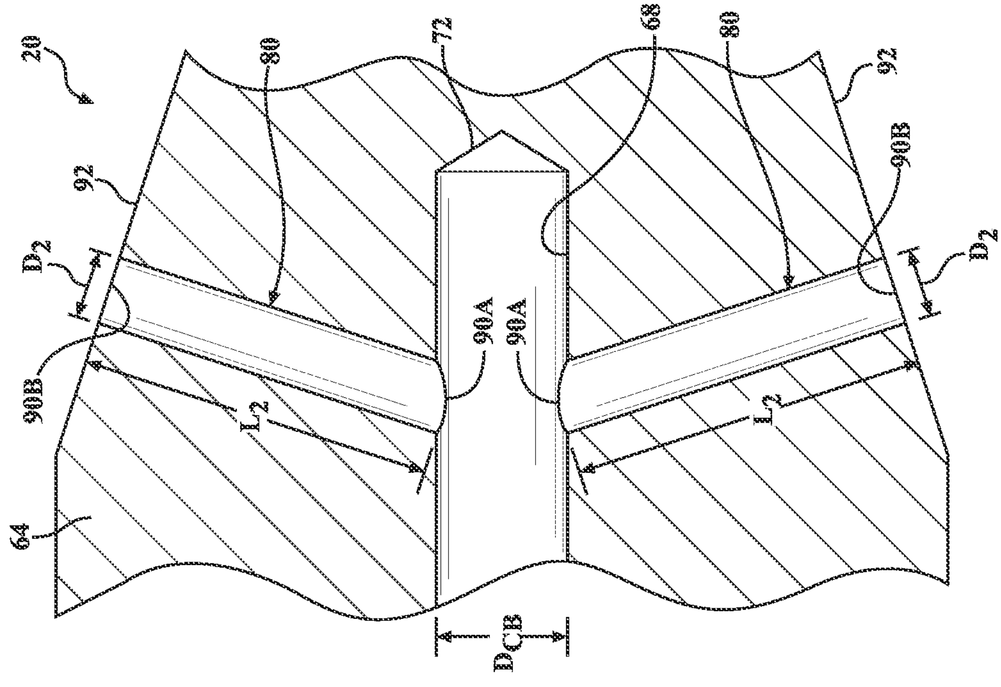
FIG. 3B is a partial cross-sectional representation of a second end region of the rotor including the plurality of second cooling jets.
Figure 3A:
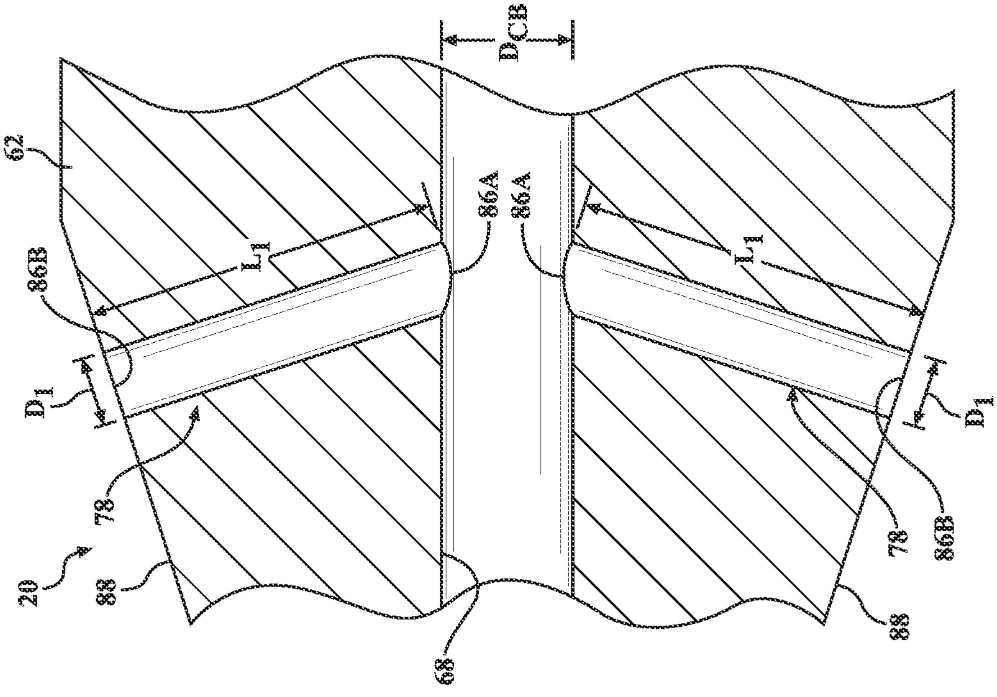
FIG. 3A is a partial cross-sectional representation of a first end region of the rotor including the plurality of first cooling jets.

Referring to FIG. 3A and FIG. 3B, each of the first cooling jets 78 has a first diameter ($D_1$), and each of the second cooling jets 80 has a second diameter ($D_2$). Additionally, each of the first cooling jets 78 has a first length ($L_1$), and each of the second cooling jets 80 has a second length ($L_2$). To produce the desired suction forces described above, $D_2$ is greater than $D_1$. For example, the ratio of ($D_2/D_1$) may be from about 1.05 to about 1.10. Accordingly, where $L_1$ and $L_2$ are equal, ($L_1/D_1$) is less than ($L_2/D_2$). As a result, the suction forces caused by the plurality of second cooling jets 80 is higher than the suction forces caused by the plurality of first cooling jets 78, which compensates for the increased distance of the plurality of second cooling jets 80 from the fluid inlet 70. Another geometric parameter that may affect the flowrate of cooling fluid through the plurality of first cooling jets 78 and the plurality of second cooling jets 80 is the ratio of the cooling bore diameter ($D_{CB}$) to the first diameter ($D_1$) of the first cooling jets 78 and/or the second diameter ($D_2$) of the second cooling jets 80. In some configurations, ($D_{CB}/D_1$) is greater than 3.3, more typically greater than 3.8, and ($D_{CB}/D_2$) is greater than 2.8, more typically greater than 3.3. For example, the first diameter ($D_1$) may be between 15% and 30%, more typically between 20% and 26%, and most typically between 22% and 24% of the cooling bore diameter ($D_{CB}$). Furthermore, the second diameter ($D_2$) may be between 20% and 35%, more typically between 24% and 32%, and most typically between 26% and 30% of the cooling bore diameter ($D_{CB}$).

Referring to FIGS. 3A through 3B, each of the first cooling jets 78 may extend between a first jet inlet 86A in fluid communication with the cooling bore 68 and a first jet outlet 86B arranged on a first radial surface 88 of the first end region 62. Similarly, each of the second cooling jets 80 may extend between a second jet inlet 90A in fluid communication with the cooling bore 68 and a second jet outlet 90B arranged on a second radial surface 92 of the second end region 64.

Figure 4A:
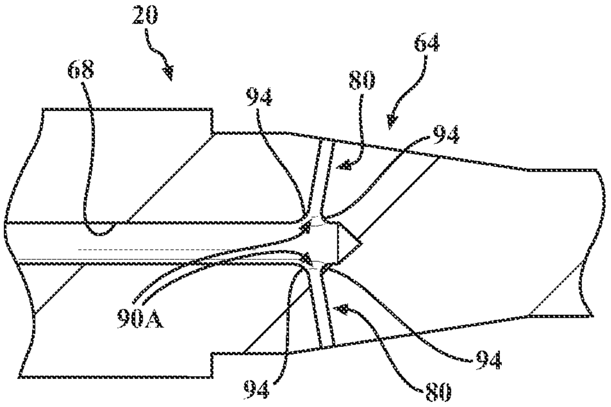
FIGS. 4A-4C are partial cross-sectional representations of the rotor illustrating various configurations of a transition between a cooling bore and a respective cooling jet.
Figure 4B:
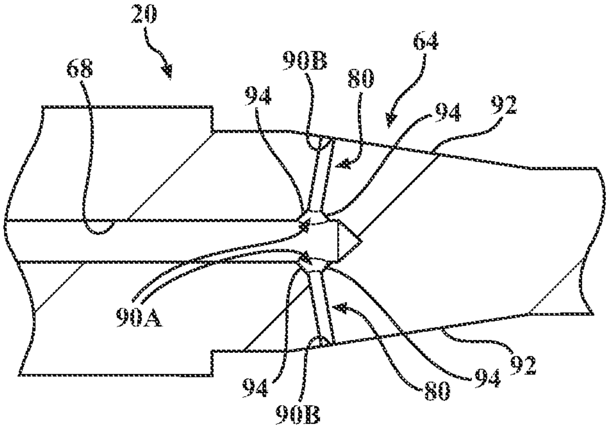
Figure 4C:
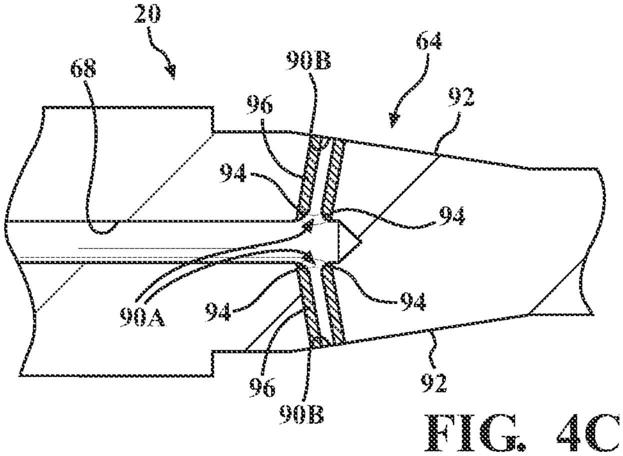

Yet another geometric parameter that may affect the flowrate of cooling fluid through the first cooling jets 78 and the second cooling jets 80 is the geometry of the connection between the cooling jets 78, 80 and the cooling bore 68 (i.e., the first jet inlets 86A and/or the second jet inlets 90A). As shown in FIGS. 4A through 4C, the first jet inlets 86A and/or the second jet inlets 90A may include a transition 94 between the cooling bore 68 and the respective cooling jet 78, 80. Each transition 94 may have one of a rounded profile (shown in FIG. 4A) and a chamfered profile (shown in FIG. 4B). Accordingly, the transitions 94 between the cooling bore 68 and first jet inlets 86A and/or the second jet inlets 90A may be configured to alter and improve the flow characteristics from the cooling bore 68 to the respective cooling jet 78, 80. In one example, the transitions 94 are formed by extrusion honing. In other examples, such as shown in FIG. 4C, the transitions 94 may be defined by a bushing insert 96 disposed in each of the respective cooling jets 78, 80.

Figure 5A:
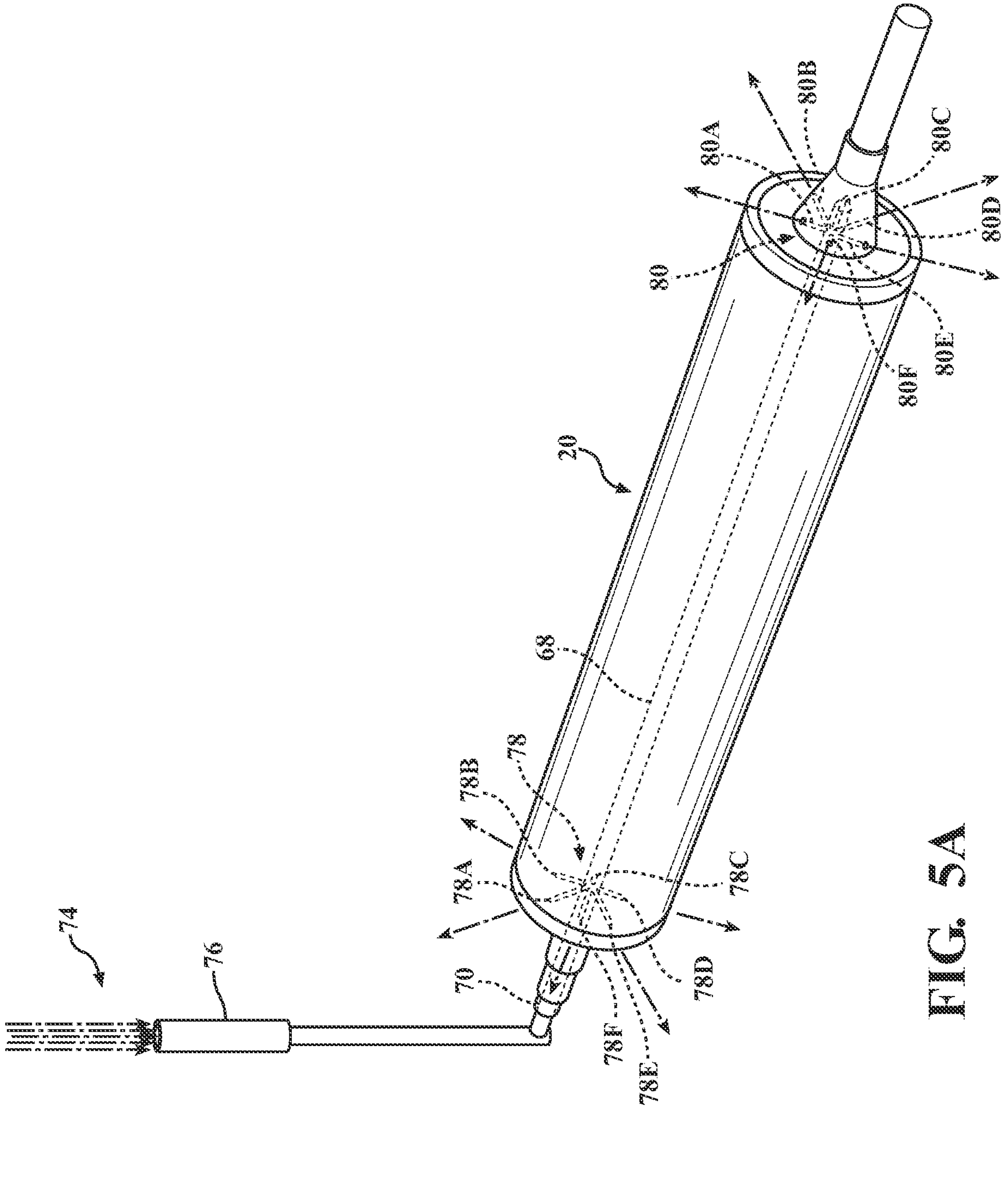
FIG. 5A is a perspective representation of the rotor where each of the plurality of first cooling jets and the plurality of second cooling jets each include six cooling jets spaced equally about the rotational axis.
Figure 5B:
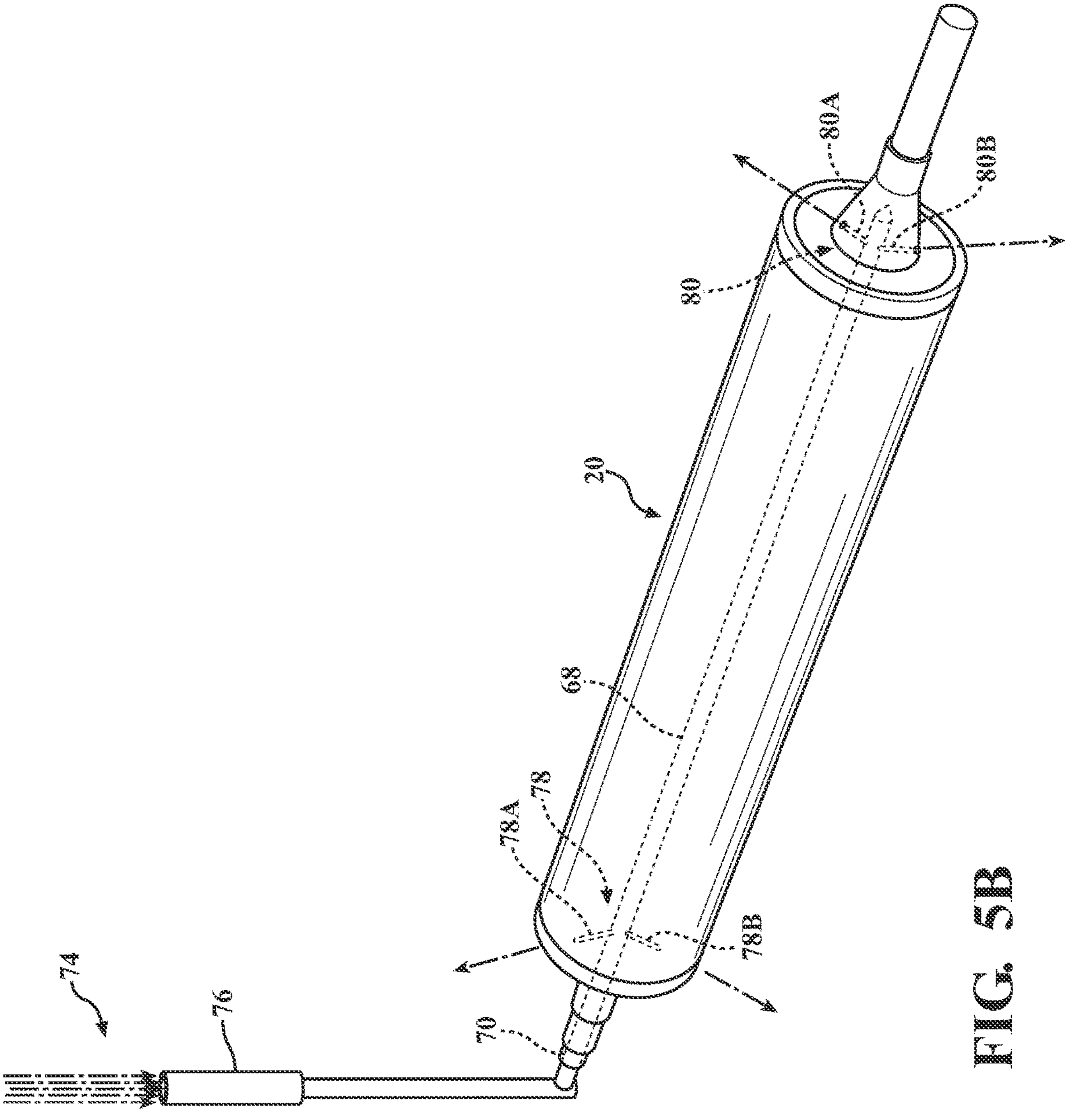
FIG. 5B is a perspective representation of the rotor where each of the plurality of first cooling jets and the plurality of second cooling jets include two opposing cooling jets.

Referring to FIG. 5A and FIG. 5B, it is also contemplated that the number and arrangement of the plurality of first cooling jets 78 and the plurality of second cooling jets 80 may be varied. For example, referring to FIG. 5A, in some configurations, the plurality of first cooling jets 78 includes six first cooling jets 78A, 78B, 78C, 78D, 78E, 78F spaced equally about the rotational axis 34 and extending radially outward from the cooling bore 68, and the plurality of second cooling jets 80 includes six second cooling jets 80A, 80B, 80C, 80D, 80E, 80F spaced equally about the rotational axis 34 and extending radially outward from the cooling bore 68. Referring to FIG. 5B, in other configurations, the plurality of first cooling jets 78 includes two opposing first cooling jets 78A, 78B extending radially outward from the cooling bore 68, and the plurality of second cooling jets 80 includes two opposing second cooling jets 80A, 80B extending radially outward from the cooling bore 68. Advantageously, the plurality of first cooling jets 78 and the plurality of second cooling jets 80 shown in FIG. 5A and FIG. 5B are disposed in a manner that does not disrupt the rotational balance of the rotor 20. It is contemplated that the plurality of first cooling jets 78 and the plurality of second cooling jets 80 may have different numbers of cooling jets than the examples given above, and that the number of the plurality of first cooling jets 78 may not be equal to the number of the plurality of second cooling jets 80. Notably, a singular cooling fluid jets are not suitable because they would result in imbalance of the rotor 20 about the rotational axis 34. A plurality of jets must be distributed evenly around the rotational axis 34 to have a net zero effect on rotational imbalance.

Figure 6:
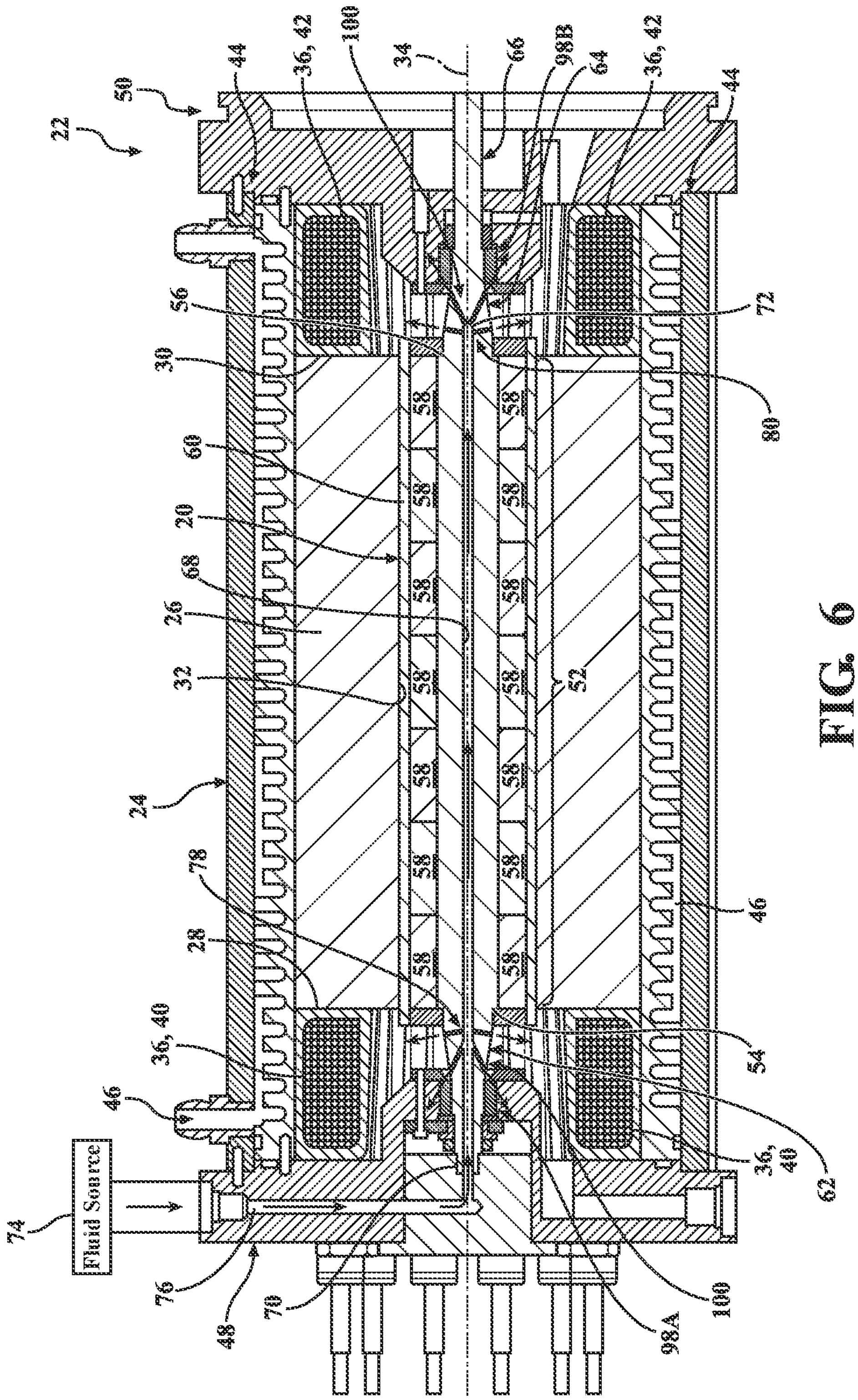
FIG. 6 is a cross-sectional representation of an electric motor including a stator and a rotor including a plurality of third cooling jets.

Referring to FIG. 6, in some examples, the electric motor 22 includes one or more bearings 98 for supporting the rotor 20 for rotation about the rotational axis 34. For example, as shown in FIG. 6, the electric motor 22 includes a first bearing 98A supporting the first end region 62 of the rotor 20, and a second bearing 98B supporting the second end region 64 of the rotor. In some examples, such as shown in FIG. 6, the rotor 20 may further include a plurality of third cooling jets 100 in fluid communication with the cooling bore 68 and extending radially outward. The plurality of third cooling jets 100 may be configured to pull cooling fluid through the cooling bore 68 and eject cooling fluid toward the one or more bearings 98 in response to centrifugal force caused by rotation of the rotor 20 about the rotational axis 34. Of course, the geometric parameters of the third cooling jets 100 may be defined as described above in the context of the first cooling jets 78 and the second cooling jets 80 such that the suction forces generated by the plurality of third cooling jets 100 in response to centrifugal force caused by rotation of the rotor 20 about the rotational axis 34 do not starve the plurality of first cooling jets 78 and the plurality of second cooling jets 80 of cooling fluid flow from the cooling bore 68.

Figure 7:
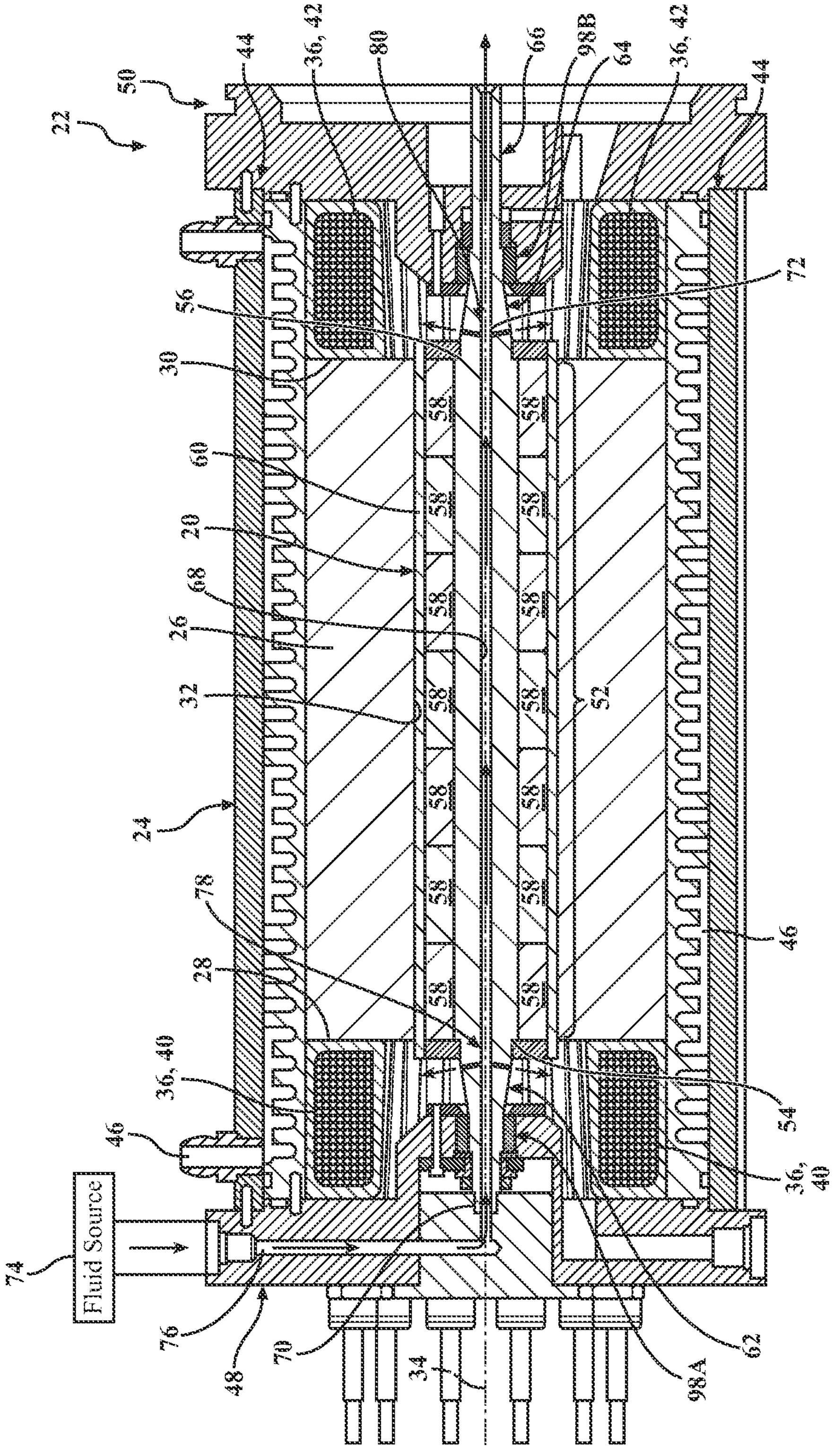
FIG. 7 is a cross-sectional representation of an electric motor including a stator and a rotor including a coupling region defining a fluid outlet.
Figure 8A:
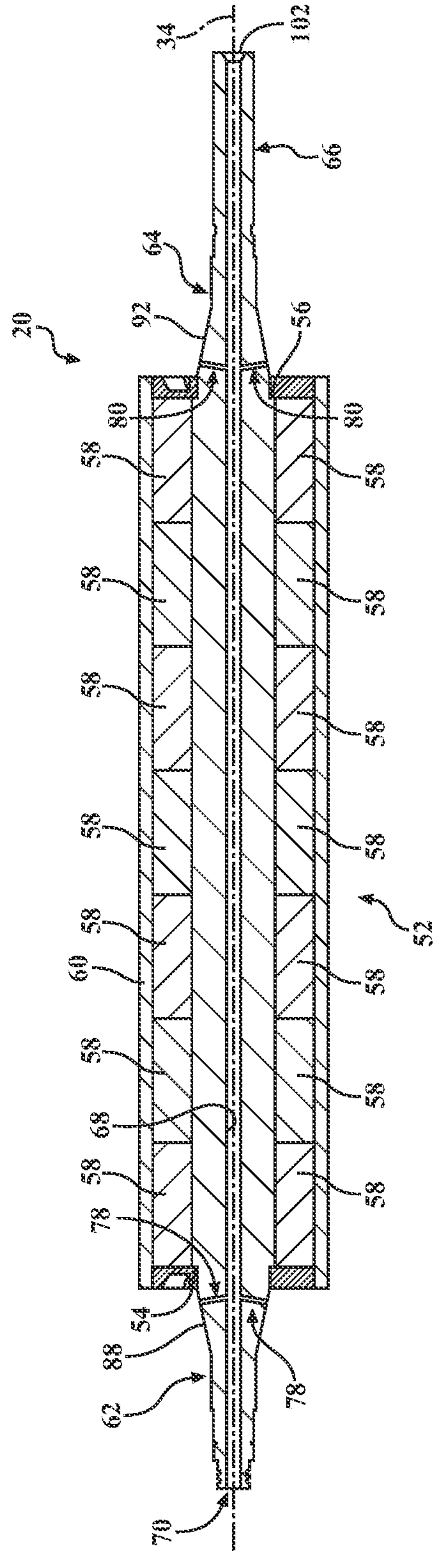
FIG. 8A is a cross-sectional representation of the rotor including the coupling region defining the fluid outlet.
Figure 8B:
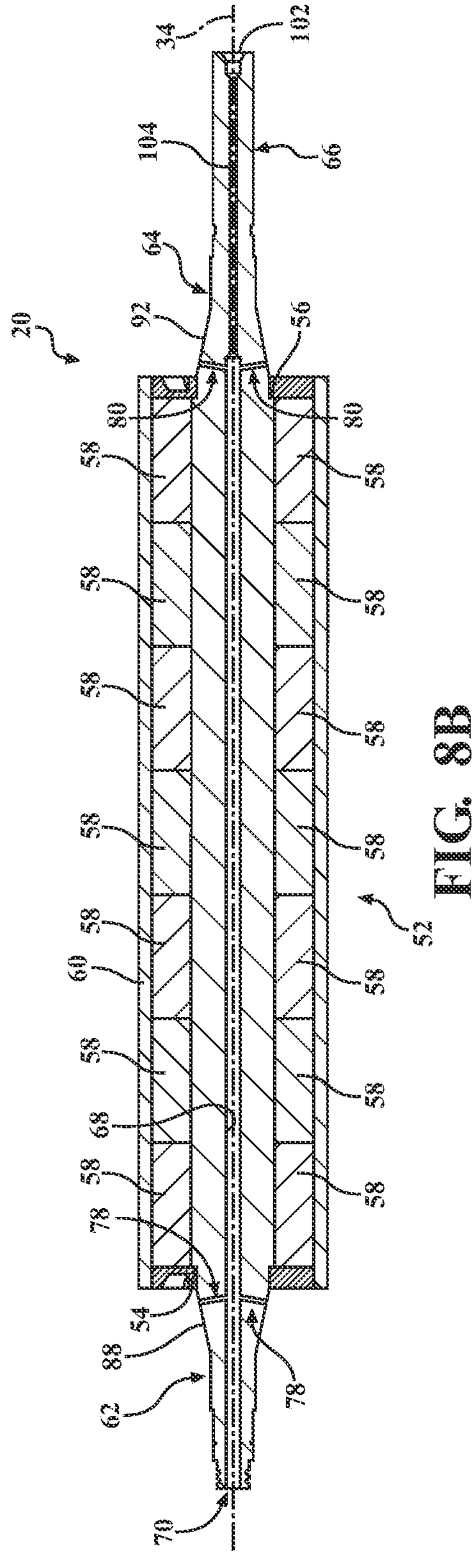
FIG. 8B is cross-sectional representation of another configuration of the rotor including the coupling region defining the fluid outlet and a stepped portion arranged adjacent to the fluid outlet.

Referring to FIGS. 7 and 8A-8B, in some configurations, the coupling region 66 defines a fluid outlet 102 in fluid communication with the cooling bore 68. Accordingly, the fluid outlet 102 may supply cooling fluid from the cooling bore 68 to an external component coupled to the coupling region 66 of the rotor. Referring to FIG. 8B, the cooling bore 68 may define a stepped portion 104 arranged adjacent to the fluid outlet 102 (e.g., between the plurality of second cooling jets 80 and the fluid outlet 102). In some examples, the stepped position 104 defines a stepped portion diameter ($D_{SP}$) that is 60% or less of the cooling bore diameter ($D_{CB}$).

Several embodiments have been described in the foregoing description. However, the embodiments described herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular. It will be further appreciated that the terms "include," "includes," and "including" have the same meaning as the terms "comprise," "comprises," and "comprising."

What is claimed is:

1. An electric motor comprising:

a stator including:

a stator core having a first end and a second end opposite the first end, the stator core defining a stator bore extending between the first end and the second end and a rotational axis concentric with the stator bore, and a plurality of windings operatively attached to the stator core and having end turns extending beyond the first end and the second end of the stator core; and a rotor configured for rotation about the rotational axis in response to the plurality of windings being energized, the rotor including:

a central region disposed in the stator bore, a first end region extending from the central region and beyond the stator bore such that the first end region is aligned with the end turns extending beyond the first end of the stator core, a second end region extending from the central region and beyond the stator bore such that the second end region is aligned with the end turns extending beyond the second end of the stator core, wherein the first end region, the central region, and the second end region cumulatively define a cooling bore extending along the rotational axis between a fluid inlet defined by the first end region and a terminal end defined by the second end region, the fluid inlet in fluid communication with a low-pressure cooling fluid source and configured to receive cooling fluid from the low-pressure cooling fluid source, a plurality of first cooling jets disposed in the first end region of the rotor and in fluid communication with the cooling bore and extending radially outward, each first cooling jet configured to pull cooling fluid through the cooling bore and eject cooling fluid toward the end turns extending beyond the first end of the stator core in response to centrifugal force caused by rotation of the rotor about the rotational axis, and a plurality of second cooling jets disposed in the second end region of the rotor and in fluid communication with the cooling bore and extending radially outward, each second cooling jet configured to pull cooling fluid through the cooling bore and eject cooling fluid toward the end turns extending beyond the second end of the stator core in response to centrifugal force caused by rotation of the rotor about the rotational axis;

wherein each first cooling jet has a first diameter ($D_1$), each second cooling jet has a second diameter ($D_2$), and $D_2$ is greater than $D_1$.

2. The electric motor according to claim 1, wherein each first cooling jet has a first length ($L_1$), each second cooling jet has a second length ($L_2$), and ($L_1/D_1$) is less than ($L_2/D_2$).

3. The electric motor according to claim 1, wherein the cooling bore is defined by a cooling bore diameter ($D_{CB}$), and wherein ($D_{CB}/D_1$) is greater than 3.3, and ($D_{CB}/D_2$) is greater than 2.8.

4. The electric motor according to claim 1, wherein the plurality of first cooling jets is configured to eject cooling fluid at a first flowrate in response to centrifugal force caused by rotation of the rotor about the rotational axis, and wherein the plurality of second cooling jets is configured to eject cooling fluid at a second flowrate, equal to the first flowrate, in response to centrifugal force caused by rotation of the rotor about the rotational axis.

5. The electric motor according to claim 4, wherein the plurality of first cooling jets is configured to reach a choke flow condition before the plurality of second cooling jets in response to centrifugal force caused by rotation of the rotor about the rotational axis.

6. The electric motor according to claim 1, wherein each first cooling jet extends between a first jet inlet in fluid communication with the cooling bore and a first jet outlet arranged on a first radial surface of the first end region, wherein each second cooling jet extends between a second jet inlet in fluid communication with the cooling bore and a second jet outlet arranged on a second radial surface of the second end region, and wherein each of the first jet inlets and the second jet inlets include a transition between the cooling bore and the respective cooling jet, with each transition having one of a chamfered profile and a rounded profile.

7. The electric motor according to claim 1, wherein the low-pressure cooling fluid source is configured to provide cooling fluid to the fluid inlet at a pressure from about 2 bar to about 5 bar.

8. The electric motor according to claim 1, further comprising one or more bearings supporting the rotor for rotation about the rotational axis, wherein the rotor further includes a plurality of third cooling jets in fluid communication with the cooling bore and extending radially outward, each third cooling jet configured to pull cooling fluid through the cooling bore and eject cooling fluid toward the one or more bearings in response to centrifugal force caused by rotation of the rotor about the rotational axis.

9. The electric motor according to claim 1, wherein:

the second end region further includes a coupling region configured to be coupled with an external component; and the coupling region defines a fluid outlet in fluid communication with the cooling bore, the fluid outlet configured to supply cooling fluid from the cooling bore to the external component.

10. A rotor for an electric motor and configured for rotation about a rotational axis, the rotor comprising:

a central region having a first end and a second end opposite the first end;

a first end region extending from the first end of the central region;

a second end region extending from second end of the central region, wherein the first end region, the central region, and the second end region cumulatively define a cooling bore extending along the rotational axis between a fluid inlet defined by the first end region and a terminal end defined by the second end region, the fluid inlet configured to be arranged in fluid communication with a low-pressure cooling fluid source to receive cooling fluid from the low-pressure cooling fluid source;

a plurality of first cooling jets disposed in the first end region and in fluid communication with the cooling bore and extending radially outward, each first cooling jet having a first diameter ($D_1$) and configured to pull cooling fluid through the cooling bore and eject cooling fluid radially outward at a first flowrate in response to centrifugal force caused by rotation of the rotor about the rotational axis, and a plurality of second cooling jets disposed in the second end region and in fluid communication with the cooling bore and extending radially outward, each second cooling jet having a second diameter ($D_2$), greater than $D_1$, and configured to pull cooling fluid through the cooling bore and eject cooling fluid radially at a second flowrate, equal to the first flowrate, in response to centrifugal force caused by rotation of the rotor about the rotational axis.

11. The rotor according to claim 10, wherein the plurality of first cooling jets is configured to reach a choke flow condition before the plurality of second cooling jets in response to centrifugal force caused by rotation of the rotor about the rotational axis.

12. The rotor according to claim 10, wherein each first cooling jet has a first length ($L_1$), each second cooling jet has a second length ($L_2$), and ($L_1/D_1$) is less than ($L_2/D_2$).

13. The rotor according to claim 10, wherein the cooling bore has a cooling bore diameter ($D_{CB}$), and wherein ($D_{CB}/D_1$) is greater than 3.3, and ($D_{CB}/D_2$) is greater than 2.8.

14. The rotor according to claim 10, wherein each first cooling jet extends between a first jet inlet in fluid communication with the cooling bore and a first jet outlet arranged on a first radial surface of the first end region, wherein each second cooling jet extends between a second jet inlet in fluid communication with the cooling bore and a second jet outlet arranged on a second radial surface of the second end region, and wherein each of the first jet inlets and the second jet inlets include a transition between the cooling bore and the respective cooling jet, with each transition having one of a chamfered profile and a rounded profile.

15. The rotor according to claim 14, wherein the transition is formed by extrusion honing.

16. The rotor according to claim 14, wherein the transition is defined by a bushing insert disposed in the respective cooling jet.

17. The rotor according to claim 10, wherein the plurality of first cooling jets includes two opposing first cooling jets extending radially outward from the cooling bore, and wherein the plurality of second cooling jets includes two opposing second cooling jets extending radially outward from the cooling bore.

18. The rotor according to claim 10, wherein the plurality of first cooling jets includes six first cooling jets spaced equally about the rotational axis and extending radially outward from the cooling bore, and wherein the plurality of second cooling jets includes six second cooling jets spaced equally about the rotational axis and extending radially outward from the cooling bore.

19. The rotor according to claim 10, wherein:

the second end region further includes a coupling region configured to be coupled with an external component; and the coupling region defines a fluid outlet in fluid communication with the cooling bore, the fluid outlet configured to supply cooling fluid from the cooling bore to the external component.

* * * * *